(12) United States Patent
Gross et al.

(10) Patent No.: US 6,742,146 B2
(45) Date of Patent: May 25, 2004

(54) TECHNIQUES FOR PROVIDING DATA WITHIN A DATA STORAGE SYSTEM

(75) Inventors: William K. Gross, Northborough, MA (US); Stephen L. Scaringella, Holliston, MA (US); Victor W. Tung, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 529 days.

(21) Appl. No.: 09/783,162

(22) Filed: Feb. 14, 2001

(65) Prior Publication Data

US 2002/0112205 A1 Aug. 15, 2002

(51) Int. Cl.[7] .................. G11C 29/00; H03M 13/00; G06F 11/00; G06F 3/00
(52) U.S. Cl. .................. 714/702; 714/758; 710/20
(58) Field of Search ................ 714/758, 752, 714/702, 30, 42; 710/20, 52

(56) References Cited

U.S. PATENT DOCUMENTS 5,617,432 A  *  4/1997  Eggenberger et al. ...... 714/752
5,862,206 A  *  1/1999  Thomas et al. .......... 370/395.4
6,279,050 B1 *  8/2001  Chilton et al. ................ 710/20
2003/0088626 A1 *  5/2003  Gupta et al. ................ 709/206

* cited by examiner

Primary Examiner—Albert Decady
Assistant Examiner—Cynthia Britt
(74) Attorney, Agent, or Firm—Chapin & Huang, L.L.C.; David E. Huang, Esq.

(57) ABSTRACT

The invention is directed to techniques that include an error detection code (e.g., a CRC code) and cleared bytes (e.g., zeroes) with data (e.g., CKD data). The use of cleared bytes with CKD data enables detection of corrupt CKD data by simply generating a CRC code based on an entire data block and comparing that generated CRC code with an initial CRC code appended to the CKD data within that data block. One arrangement of the invention is directed to a data storage system that includes a circuit having a memory pipeline that receives a stream of data elements, and provides a series of byte groups that includes the stream of data elements, an error detection code and a set of cleared bytes to a set of storage devices. Each of the series of byte groups provided by the memory pipeline has a same byte width. The inclusion of the error detection code and the set of cleared bytes enables consistent alignment of each byte group in the series.

28 Claims, 11 Drawing Sheets

TECHNIQUES FOR PROVIDING DATA WITHIN A DATA STORAGE SYSTEM

BACKGROUND OF THE INVENTION

A typical data storage system stores and retrieves data for one or more external hosts. It is common for such a data storage system to include front-end circuitry, a cache, back-end circuitry, and a set of disk drives. In general, the cache operates as a buffer for data exchanged between the external hosts and the disk drives. The front-end circuitry operates as an interface for transferring data from the hosts to the cache, and vice versa. Similarly, the back-end circuitry operates as an interface for transferring data from the cache to the disk drives, and vice versa.

Some data storage systems are capable of storing and retrieving data having a count-key-data (CKD) record format (hereinafter referred to as CKD data). Such data consists of a count field containing the number of bytes of data, an optional key field by which particular records can be easily recognized, and the data itself. In general, CKD data does not have a standard size. That is, CKD data does not arrive in complete blocks, i.e., consistently aligned with a block or sector boundary. Rather, CKD data is arbitrary in size, varying from transmission to transmission.

Some data storage systems, which are equipped to handle CKD data, associate cyclic redundancy check (CRC) codes with the CKD data for fault tolerance purposes. In one conventional data storage system, when the front-end circuitry receives CKD data for storage, the front-end circuitry associates a CRC code with the CKD data and provides the CKD data and the associated CRC code to the cache. The back-end circuitry then reads the CKD data and the associated CRC code out of the cache, confirms that the CKD data is not corrupt or garbled based on the CRC code, and stores the CKD data and the CRC code on the set of disk drives.

It should be understood that data transfers between components of the above-described conventional data storage system (i.e., between the front-end circuitry and the cache, between the cache and the back-end circuitry, etc.) occur in block-sized or block-aligned operations. The front-end circuitry typically handles conversion of the non-standard-sized CKD data to data blocks. In particular, in response to CKD received from a host for storage, the front-end circuitry provides, to the cache, a block of data including (i) the CKD data, (ii) an associated CRC code appended to an end of the CKD data, and (iii) old, invalid data remaining in the front-end circuitry for alignment with a block boundary (e.g., a 512 byte boundary). It should be understood that the CRC code applies only to the CKD data, and not to the old, invalid data. Furthermore, in a separate signal (e.g., a message to the back-end circuitry), the front-end circuitry identifies the number of bytes of CKD data in the data block so that the back-end circuitry can use that number as an offset to find the CRC code.

As explained earlier, when the back-end circuitry retrieves the block of data from the cache, the back-end circuitry checks the CRC code to confirm that the CKD data is still intact, i.e., verifies that the CKD data is not corrupt or garbled in some manner. To this end, the back-end circuitry generates (i) a second CRC code based on the entire data block, (ii) a third CRC code based only on the old, invalid data, and (iii) an expected value for the initial CRC code for the CKD data (i.e., the CRC code appended to the CKD data within the data block) based on the second and third CRC codes (e.g., by performing an exclusive OR operation on the second and third CRC codes). The back-end circuitry then compares the expected value with the initial CRC code. If there is a match, the back-end circuitry concludes that the CKD data is without error and stores the CKD data (and perhaps the initial CRC code as well) in the disk drives. However, if the generated expected value does not match the initial CRC code, the back-end circuitry concludes that the CKD data includes an error (i.e., that one or more bits of the CKD data is incorrect), and initiates an error handling procedure (e.g., notifies the front-end circuitry that the CKD data includes an error and invites the front-end circuitry to retransmit the CKD data).

SUMMARY OF THE INVENTION

Unfortunately, there are deficiencies to the above-identified conventional data storage system which stores CKD data by including old, invalid data with the CKD data for block alignment purposes. For example, for the back-end circuitry of the above-described conventional data storage system to confirm that the CKD data from the front-end circuitry is not corrupt, the back-end circuitry performs a complex series of operations. In particular, the back-end circuitry generates (i) a second CRC code based on the entire data block containing the CKD data, (ii) a third CRC code based only on the old, invalid data in the data block, and (iii) an expected result based on the second and third CRC codes. The back-end circuitry then compares the expected value with the initial CRC code (i.e., the CRC code appended to the CKD data within the data block) to determine whether the CKD data is corrupt. This complex series of operations, which is typically implemented in software, requires a significant amount of time to complete. As a result, the transfer of CKD data through the back-end circuitry tends to be relatively slow from a performance standpoint compared to transfer times of other types of data due to the large amount of error checking overhead performed by the back-end circuitry.

In contrast to the above-described conventional data storage system, the invention is directed to data storage techniques that include an error detection code and cleared bytes (e.g., zeroes) with certain types of data (e.g., CKD data). The use of cleared bytes with CKD data alleviates the need to perform a complex series of software operations at the back-end to detect corrupted CKD data. Rather, when the CKD data is followed by an appended CRC code and cleared bytes to form an aligned block of data, error checking of the CKD data (and the entire data block) can simply involve generating a CRC code based on the entire data block and comparing that generated CRC code with the initial CRC code appended to the CKD data within that data block. Accordingly, the error detection process is relatively simpler and takes less time than the above-described conventional approach.

One arrangement of the invention is directed to a data storage system that includes a circuit (e.g., a front-end interface) having a memory pipeline that (i) receives a stream of data elements (e.g., CKD data), and (ii) provides a series of byte groups that includes the stream of data elements, an error detection code (e.g., a CRC code) and a set of cleared bytes (e.g., zeroes) to a set of storage devices. The circuit further includes a controller, coupled to the memory pipeline, that provides the error detection code and the set of cleared bytes to the memory pipeline such that each of the series of byte groups provided by the memory pipeline has a same byte width (e.g., eight bytes). The inclusion of the error detection code and the set of cleared bytes enables consistent alignment of each byte group in the series. Furthermore, if the series of byte groups is loaded into an initialized memory sector (e.g., a cleared cache of the data storage system), a CRC code can be (i) generated based on the entire sector and (ii) compared to the CRC code within the series of byte groups to determine whether the stream of data elements is without error.

In one arrangement, the memory pipeline includes an output stage that connects to an external memory, and the controller is configured to direct the memory pipeline to further provide a set of subsequent byte groups exclusively having cleared bytes. In this arrangement, the output stage provides both the series of byte groups and the set of subsequent byte groups to the external memory to exactly fill a sector (e.g., 512 bytes) of an external memory (e.g., cache memory, dual-ported random access memory leading to the cache memory, a disk drive, etc.) with the series of byte groups and the set of subsequent byte groups. When a back-end interface receives the sector, the back-end interface can operate on the entire sector. For example, if the error detection code within the series of byte groups is a CRC code, the back-end interface can generate another CRC code on the entire block, and simply compare the CRC code within the series of byte groups to the generated CRC code to determine whether the data within the series of byte groups is error free.

In one arrangement, the memory pipeline includes an input stage that receives the stream of data elements, an output stage that provides the series of byte groups, and an assembly stage interconnected between the input and output stages. The assembly stage has a set of registers. The controller is configured to (i) load a data element from the stream of data elements into each of the set of registers sequentially until all of the registers in the set of registers contain a respective data element thus forming a byte group, and (ii) effectuate transfer of that byte group from the assembly stage to the output stage. The controller is further configured to reset any remaining registers after a last data element at an end of the stream of data elements loads into the set of registers. Preferably, the controller is further configured to load the error detection code into one of the remaining registers after the controller resets the remaining registers. In one arrangement, the controller is configured to load the error detection code into the next register location following the last data element at an end of the stream of data elements. Once the set of registers is provided with the error detection code and cleared remaining bytes, the contents of the set of registers can be provided through the output stage as one of the series of byte groups.

In one arrangement, the controller includes an input that receives a count signal indicating the number of data elements in the stream of data elements. The controller is configured to reset the remaining registers based on the number of data elements in the stream of data elements. When the stream of data elements is CKD data, each data element can be a byte of data, and the count signal can include the number of bytes of data from the count field of the CKD data.

In one arrangement, the controller is further configured to (i) transfer a byte group having the error detection code to the output stage, and (ii) subsequently reset all of the registers of the set of the registers of the assembly stage to provide a set of subsequent byte groups exclusively having cleared bytes. As such, the output stage provides both the series of byte groups and the set of subsequent byte groups to an external memory to exactly fill a sector of the external memory with the series of byte groups and the set of subsequent byte groups. Accordingly, the controller can generate the set of subsequent byte groups by simply clearing each register of the set of registers (e.g., asserting the reset lines of the registers) for a particular number of clock cycles so that the series of byte groups and the set of subsequent cleared byte groups fill a complete sector.

The features of the invention, as described above, may be employed in data storage systems, devices and methods, as well as other computer-related components such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to data storage techniques that include an error detection code and cleared bytes (e.g., zeroes) with certain types of data (e.g., CKD data). The use of cleared bytes with CKD data alleviates the need to perform a complex series of software operations at the back-end to detect corrupted CKD data. Rather, when the CKD data is followed by an appended CRC code and cleared bytes to form an aligned block of data, error checking of the CKD data (and the entire data block) can simply involve generating a CRC code based on the entire data block and comparing that generated CRC code with the initial CRC code appended to the CKD data within that data block. Accordingly, the error detection process is relatively simpler and takes less time than a conventional approach which does not include cleared bytes with CKD data, but that performs more complex CRC code operations based on old, invalid data included with CKD data.

Figure 1:
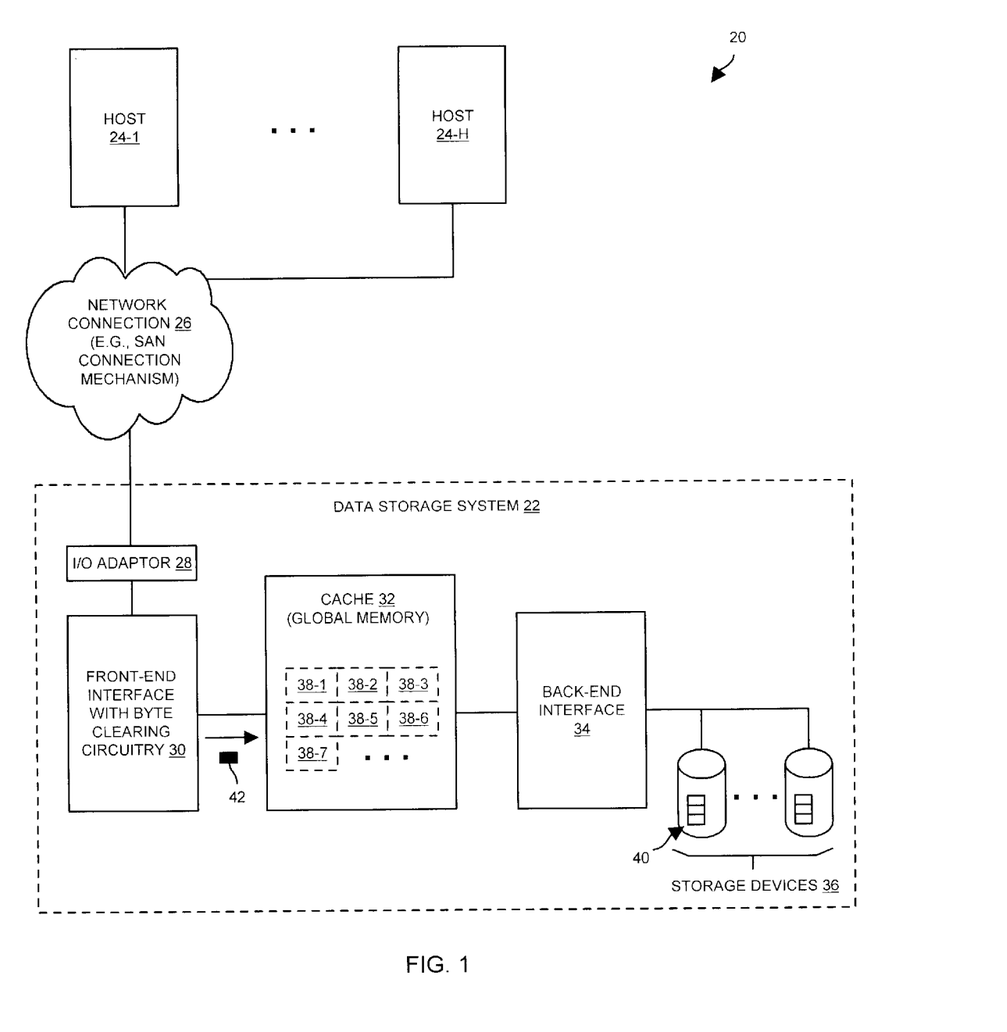
FIG. 1 is a block diagram of a data storage network which is suitable for use by the invention.

FIG. 1 shows a data storage network 20 which is suitable for use by the invention. The data storage network 20 includes a data storage system 22, external hosts 24-1, ..., 24-H (collectively, external hosts 24) and a network connection 26. By way of example only, the network connection 26 is shown as a storage area network (SAN) connection mechanism such as the Enterprise System Connection (ESCON) transport.

The data storage system 22 includes an input/output (I/O) adaptor 28, a front-end interface 30, a cache 32, a back-end interface 34, and a set of storage devices 36 (e.g., disk drives). The front-end interface 30 is equipped with byte-clearing circuitry in order to pad data received from the hosts 24 with cleared bytes so that the data is aligned with a standard boundary (e.g., a sector boundary). The cache 32, which is also referred to as global memory, operates as a buffer for data exchanged between the hosts 24 and the storage devices 36. In particular, the cache 32 includes memory sectors 38 (e.g., sectors 38-1, 38-2, ...) for storing blocks of data exchanged between the front-end interface 30 and the back-end interface 34. For example, the above-described padded data is stored in a sector 38 of the cache 32. The storage devices 36 include data sectors 40 which map to the sectors 38 in the cache 32. Each sector 38, 40 has a standard size, e.g., 512 bytes. The back-end interface 34 transfers data from the sectors 38 of the cache 32 to the sectors 40 of the storage devices 36, and vice versa.

Preferably, the data storage system 22 is capable of operating in different modes. A technician or operator of the data storage system 22 can configure the data storage system 22 to operate in any one of these modes (e.g., by setting an operating system parameter).

In one mode (hereinafter referred to as "sector alignment mode"), the front-end interface 30 receives non-standard-sized data (e.g., CKD data), and provides a data block 42 to the cache 32. The data block 42 includes the received non-standard-sized data, followed by an error detection code (e.g., a CRC code) and a set of cleared bytes. When the back-end interface 34 receives the data block 42, the back-end interface 34 can simply generate another error detection code (e.g., another CRC code) based on the entire data block 42, and compare the other error detection code with the error detection code in the data block 42 to determine whether the data within the data block 42 is without error. Accordingly, the error checking operations performed by the back-end interface 34 are less complex and require less time than conventional back-end error checking operations which involve generating CRC codes based on old, invalid data prior to generating an expected result for comparison to a CRC code contained within a data block.

In another mode (hereinafter referred to as "shortened mode"), the front-end interface 30 receives non-standard-sized data (e.g., CKD data), and provides less than a data block 42 to the cache 32. The provided data includes the received non-standard-sized data, followed by an error detection code (e.g., a CRC code) and a set of cleared bytes. Preferably, in the shortened mode, there are no byte groups exclusively containing cleared bytes provided by the front-end interface 30 after the non-standard-sized data. Shortened mode is particularly useful when loading data into a sector 38 of the cache 32 when the initial contents of the sector 38 are clear (e.g., zero) such as immediately after a startup or complete reset of the data storage system 22. Since the initial contents of the sector 38 are clear, it is unnecessary to provide byte groups exclusively containing cleared bytes because such byte groups would simply overwrite existing cleared bytes with cleared bytes again. Accordingly, when the back-end interface 34 retrieves, from the cache 32, a data block which includes the non-standard-sized data, the error detection code and cleared bytes (at least some of which were cleared prior to the store operation by the front-end interface 30), the back-end interface 34 can operate in the same manner as in the sector alignment mode. That is, the back-end interface 34 simply generates another error detection code based on the entire data block, and compares the generated error detection code with the error detection code in the data block to determine whether the data within the data block is without error. As a result, shortened mode provides a performance enhancement in some situations (e.g., immediately after reset).

In yet another mode (hereinafter referred to as "disabled mode"), the front-end interface 30 does not clear any bytes. Disabled mode is similar to how a conventional data storage system operates. That is, when the front-end interface 30 is placed in disabled mode and receives non-standard-sized data, the front-end interface 30 provides a data block including the non-standard-sized data, an error detection code and old, invalid data in a conventional manner. In disabled mode, the back-end interface 34 has the burden of performing multiple CRC operations in a conventional manner to determine whether the non-standard-sized data is corrupt, i.e., the burden of performing CRC operations based on the old, invalid data. Further details of the invention will now be described with reference to FIG. 2.

Figure 2:
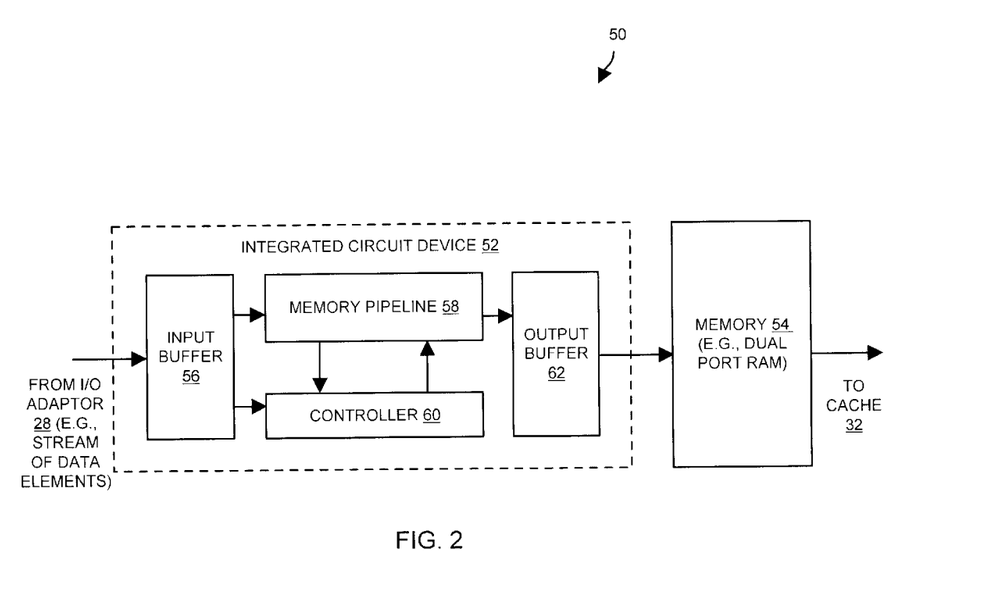
FIG. 2 is a block diagram of a portion of a front-end interface of a data storage system of the data storage network of FIG. 1.

FIG. 2 shows a portion 50 of the front-end interface 30 of FIG. 1. The portion 50 includes an integrated circuit device 52 and memory 54 (e.g., a dual-port RAM) which couples to the integrated circuit device 52. The integrated circuit device 52 includes an input buffer 56, a memory pipeline 58, a controller 60 and an output buffer 62. As further shown in FIG. 2, the input buffer 56 couples to the I/O adaptor 28. Additionally, the memory 54 couples to the cache 32. As shown by the arrows, the general flow of signals through the portion 50 is from the input buffer 56, through the memory pipeline 58 and controller 60, through the output buffer 62, and to the memory 54. Further details of the integrated circuit device 52 will now be described with reference to FIG. 3.

Figure 3:
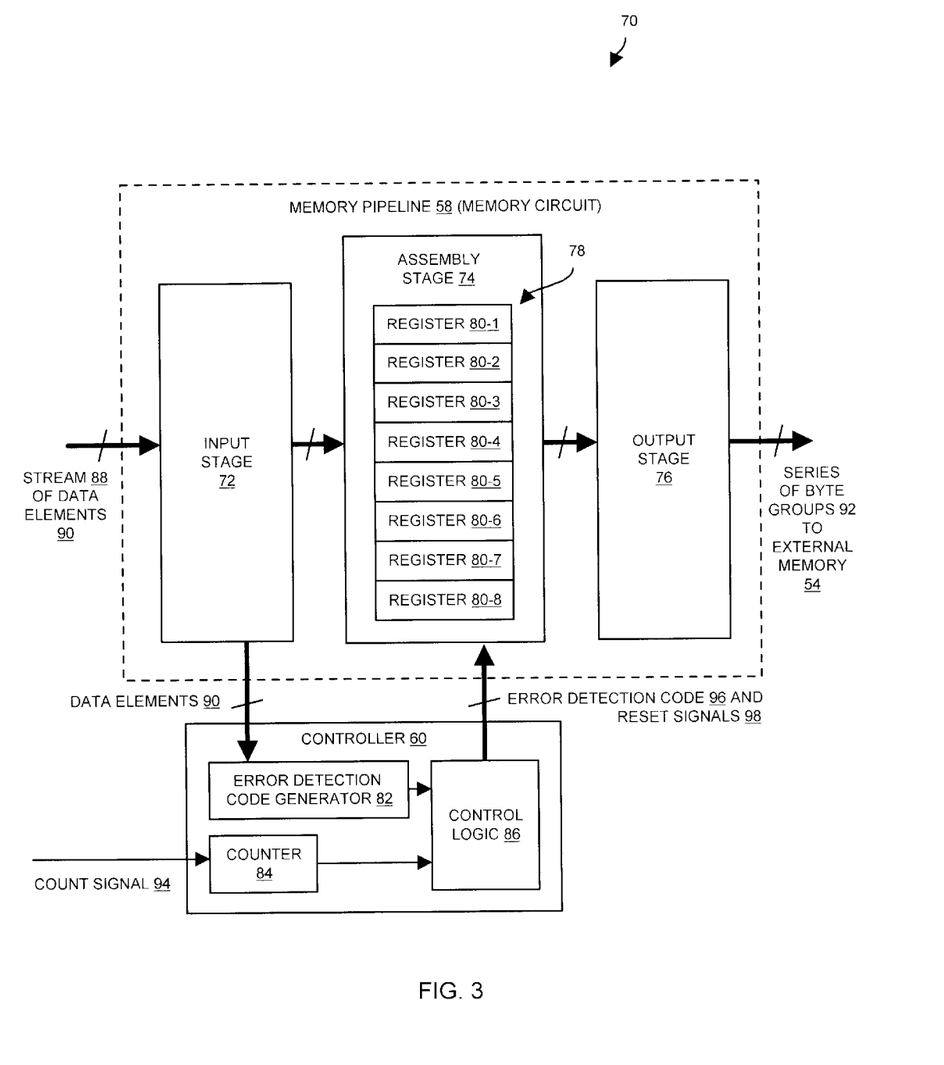
FIG. 3 is a block diagram of a portion of an integrated circuit device of the front-end interface of FIG. 2.

FIG. 3 shows a portion 70 of the integrated circuit device 52. The portion 70 includes the memory pipeline 58 and the controller 60. As shown, the memory pipeline 58 (i.e., a memory circuit) includes an input stage 72, an assembly stage 74, and an output stage 76. The assembly stage 74 includes a set 78 of registers 80. The controller 60 includes an error detection code generator 82, a counter 84, and control logic 86.

During operation, the memory pipeline 58 receives a stream 88 of data elements 90 from the I/O adaptor 28, and provides a series of byte groups 92 to the memory 54 based on a count signal 94 (e.g., from an external processor of the front-end interface 30) and the stream 88 of data elements 90. The series of byte groups 92 includes the data elements 90 of the stream 88, an error detection code 96 and a set of cleared bytes 97 (also see FIG. 5).

Preferably, the count signal 94 indicates the number of data elements 90 in the stream 88 of data elements 90 (e.g., from the count field of CKD data when the stream 88 is CKD data). This number is stored in the counter 84 and provided to the control logic 86 of the controller 60 to enable the control logic 86 to identify the end of the stream 88 of data elements 90 (e.g., identify the register 80 holding the last data element 90.

The input stage 72 provides the stream 88 of data elements 90 to both the assembly stage 74 and the error detection code generator 82 of the controller 60. The error detection code generator 82 generates the error detection code 96 based on the stream 88 of data elements 90. The control logic 86, which controls latching of the data elements 90 from the input stage 72 into the set 78 of registers 80, handles storing of the error detection code 96 within the set 78 of registers 80 at the end of the stream 88 of data elements 90 based on the number of data elements 90 in the stream 88. Additionally, based on the number of data elements 90 in the stream 88, the control logic 86 provides a set of reset signals 98 to the assembly stage 74 in order to form the set of cleared bytes 97 within the series of byte groups 92. Details of the operation of the integrated circuit device 52 (see FIGS. 2 and 3) will now be provided with reference to FIG. 4.

Figure 4:
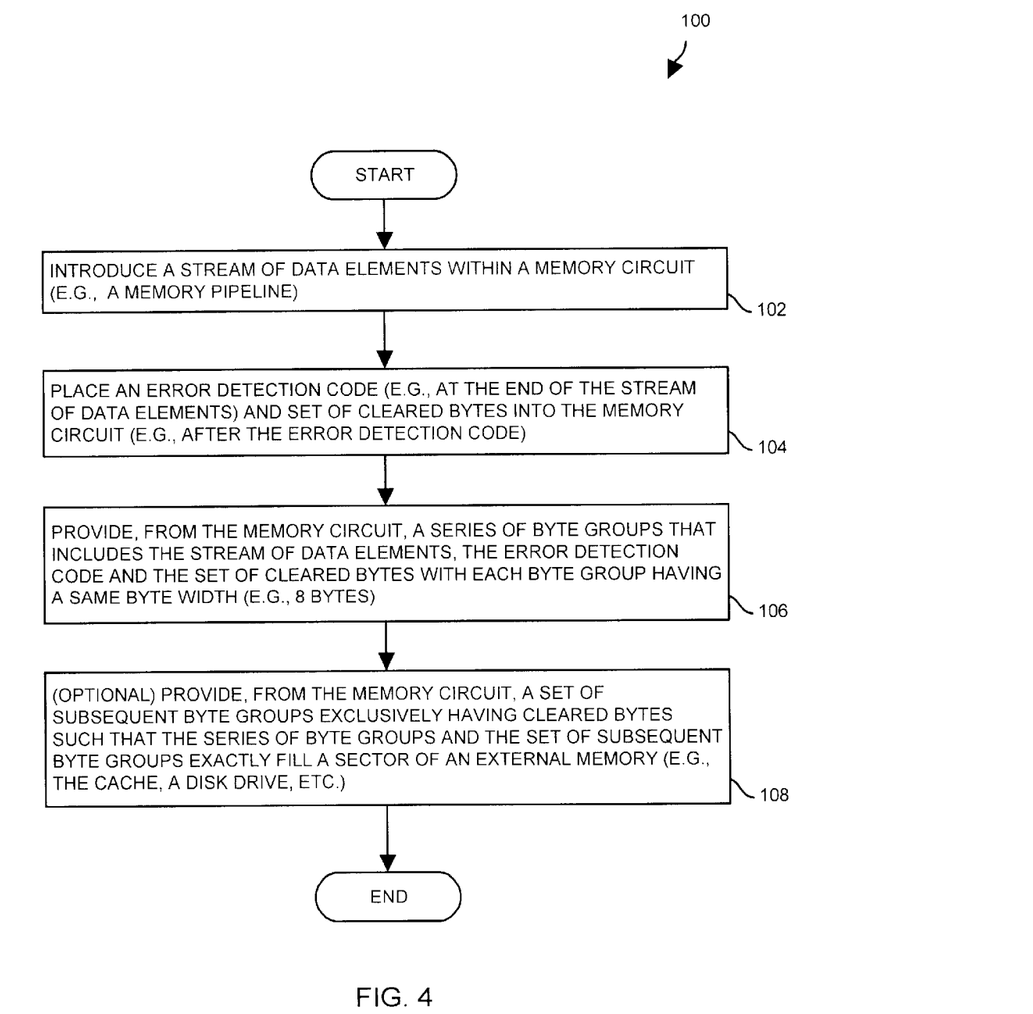
FIG. 4 is a flowchart of a procedure performed by the portion of the integrated circuit device of FIG. 3.

FIG. 4 shows a flowchart of a procedure 100 which is performed by the integrated circuit device 52 when the data storage system 22 operates in either sector alignment mode or shortened mode. In step 102, the stream 88 of data elements 90 is introduced into the memory pipeline 58 (i.e., the memory circuit). In particular, the stream 88 of data elements 90 originates from a host 24, and passes through the I/O adaptor 28 and the input buffer 56 of the integrated circuit device 52 to the memory pipeline 58. In one arrangement, the stream 88 of data elements 90 is CKD data.

In step 104, the controller 60 of the integrated circuit device 52 places an error detection code 96 and cleared bytes at the end of the stream 88 of data elements 90 within the memory pipeline 58. The error detection code 96 is based on the stream 88 of data elements 90. The number of cleared bytes in the set of cleared bytes is based on the number of data elements 90 in the stream 88 (identified by the count signal 94). Preferably, the cleared bytes follow the error detection code 96.

In step 106, a series of byte groups 92 is provided by the memory pipeline 58. The series of byte groups 92 includes the stream 88 of data elements 90, the error detection code 96 and the cleared bytes. Each byte group 92 has the same byte width (e.g., 8 bytes).

When the data storage system 22 operates in shortened mode, the integrated circuit device 52 does not perform step 108. However, when the data storage system 22 operates in sector alignment mode, the integrated circuit device 52 performed step 108.

In step 108, a set of subsequent byte groups exclusively having cleared bytes is provided by the memory pipeline 58 such that the series of byte groups and the set of subsequent byte groups exactly fill a sector of an external memory (e.g., the cache 32, the storage devices 36, etc.).

It should be understood that particular steps of the procedure 100 can occur concurrently. For example, the step of receiving data elements 90 of the stream 88 of data elements 90 (step 102) can continue while the memory circuit begins providing a series of byte groups (step 106). Additionally, the error detection code 96 can be placed into the memory circuit (step 104) while the memory circuit continues to provide the series of byte groups (step 106). Further details of the invention will now be provided with reference to FIG. 5.

Figure 5:
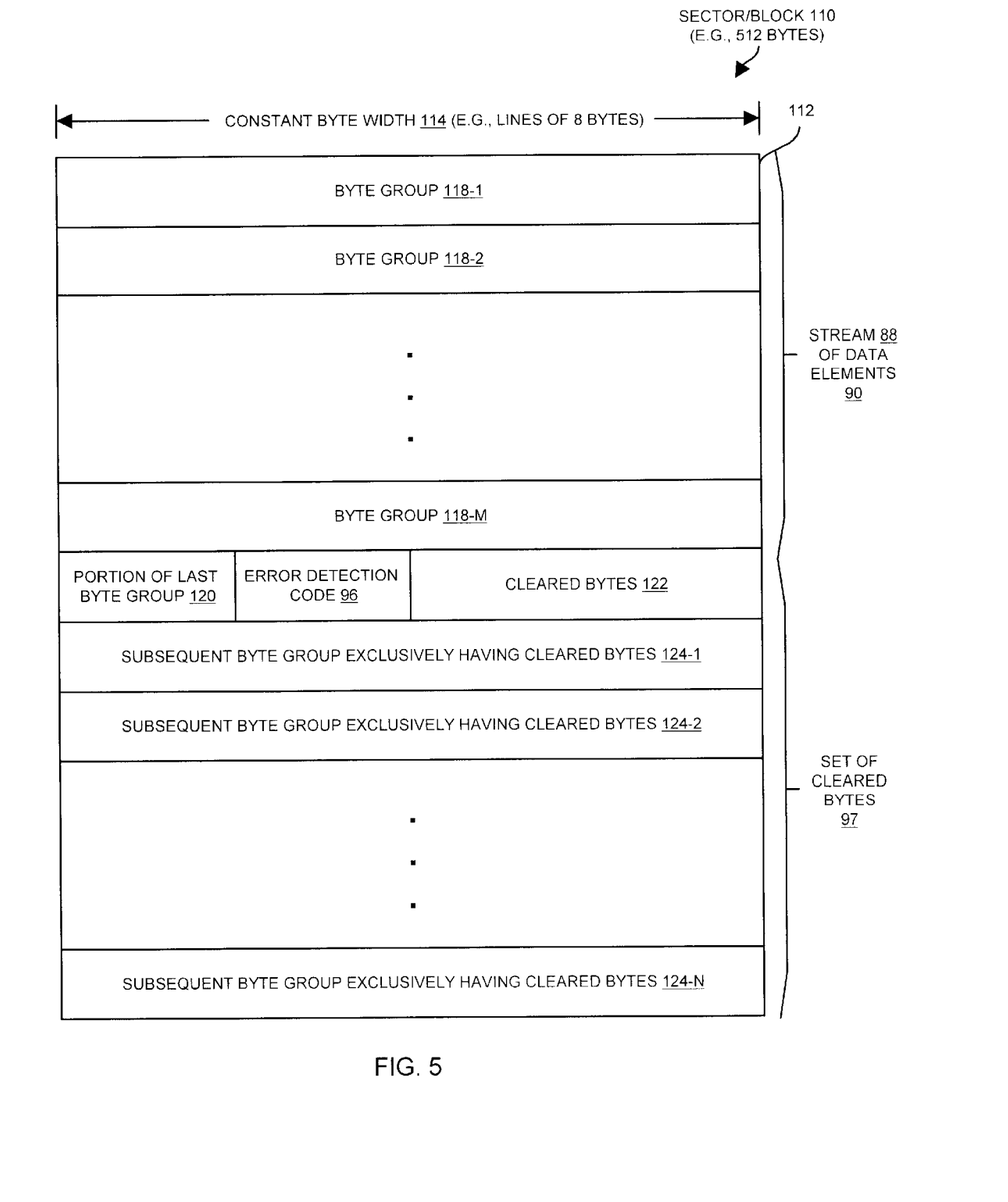
FIG. 5 is a block diagram of a sector containing data elements which is provided by the portion of the integrated circuit device of FIG. 3.

FIG. 5 shows a sector or block of data 110 which is provided by the front-end interface 30 to the cache 32 when the data storage system 22 operates in sector alignment mode. The data sector 110 includes the stream 88 of data elements 90, followed by the error detection code 96 and the set of cleared bytes 97.

As shown in FIG. 5, the data sector 110 includes multiple lines of bytes 112. Each byte line 112 is a byte group 118, i.e., one of the series of byte groups 92 provided by the memory pipeline 58. In particular, each byte line 112 is the outputted contents of the set 78 of registers 80 of the assembly stage 74. For example, the byte group 118-1 is the outputted contents of the set 78 of registers 80 after the controller 60 sequentially fills all of the registers 80 with data elements 90 from the stream 88 of data elements 90 (also see FIG. 3). The byte group 118-2 is the outputted contents of the set 78 of registers 80 after the controller 60 sequentially refills all the registers 80 with new data elements 90 from the stream 88 of data elements 90, and so on. Accordingly, each byte line 112 has a constant byte width 114 (e.g., 8 bytes). In one arrangement, the constant byte width 114 is the same size as a natural word of the data storage system 22 (e.g., 64-bits).

As explained earlier, the controller 60 generates an error detection code 96 based on the stream 88 of data elements 90. In one arrangement, the error detection code is a CRC code (e.g., a remainder generated by dividing the stream 88 of data elements 90 by a generator polynomial). In one arrangement, the CRC code has the size of a byte. The controller 60 then loads the error detection code 96 into the set 78 of registers 80 at the end of the stream 88 of data elements 90 and clears any remaining unused registers 80. In one arrangement, the controller 60 clears all of the unused registers 80 following the end of the stream 88 of data elements 90, and subsequently loads the register 80 adjacent the end of the stream 88 of data elements 90 with the error detection code 96. The resulting byte group 92 includes a portion of the stream 88 of data elements 90 (a portion of the last byte group 120), the error detection code 96, and a set of cleared bytes 122 (see FIG. 5).

If the data storage system 22 operates in shortened mode, the front-end interface 30 does not provide any additional byte groups exclusively having cleared bytes. However, if the data storage system 22 operates in sector alignment mode, the front-end interface 30 provides subsequent byte groups exclusively having cleared bytes 124 such that the stream 88 of data elements 90, the error detection code 96, and set of cleared bytes 97 (i.e., the cleared bytes 122,124) form the complete data sector 110, shown to FIG. 5.

It should be understood that when the back-end interface 34 reads the data sector 110 from the cache 32 for storage within the set of storage devices 36, the back-end interface 34 can simply generate an error detection code on the complete data sector 110, and compare that generated error detection code with the error detection code 96 contained within the data sector 110. A result of the comparison indicates whether the data within the sector 110 is without error. In one arrangement, the back-end interface 34 generates a CRC code as the error detection code. Further details of how information loads into the set 78 of registers 80, and how the set 78 of registers 80 provides its contents will now be provided with reference to FIGS. 6–15.

Figure 6:
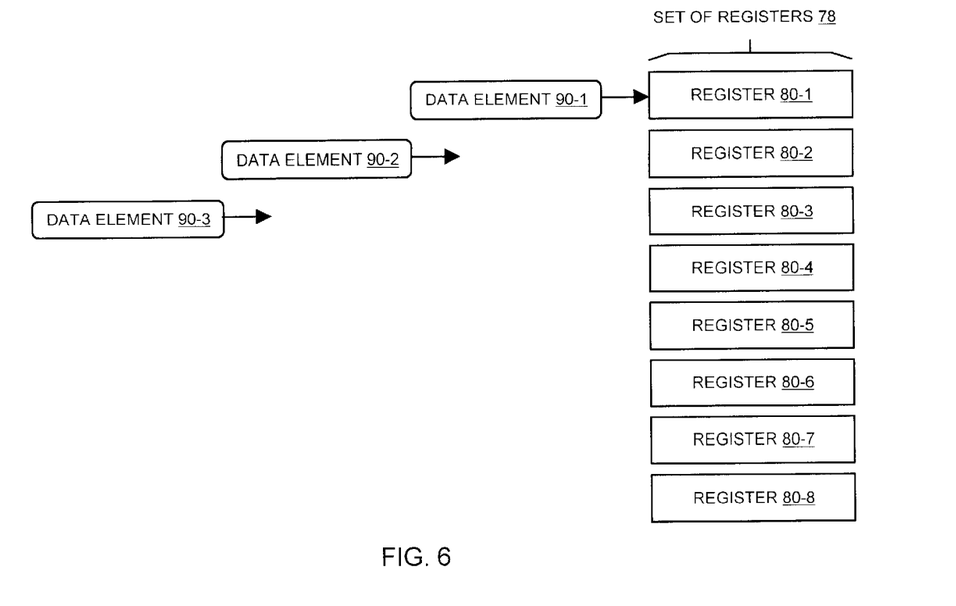
FIG. 6 is a block diagram illustrating how data elements sequentially load within a set of registers of the portion of the integrated circuit device of FIG. 3.

FIG. 6 illustrates how data elements 90 load within the set 78 of registers 80 of the integrated circuit device 52 (also see FIG. 3). As shown, the data elements 90 load sequentially into the set 78 of registers 80. For example, the data element 90-1 loads into the register 80-1. Next, the data element 90-2 loads into the register 90-2, and so on. The control logic 86 of the controller 60 controls latching of the data elements 90 into each register 80.

Figure 7:
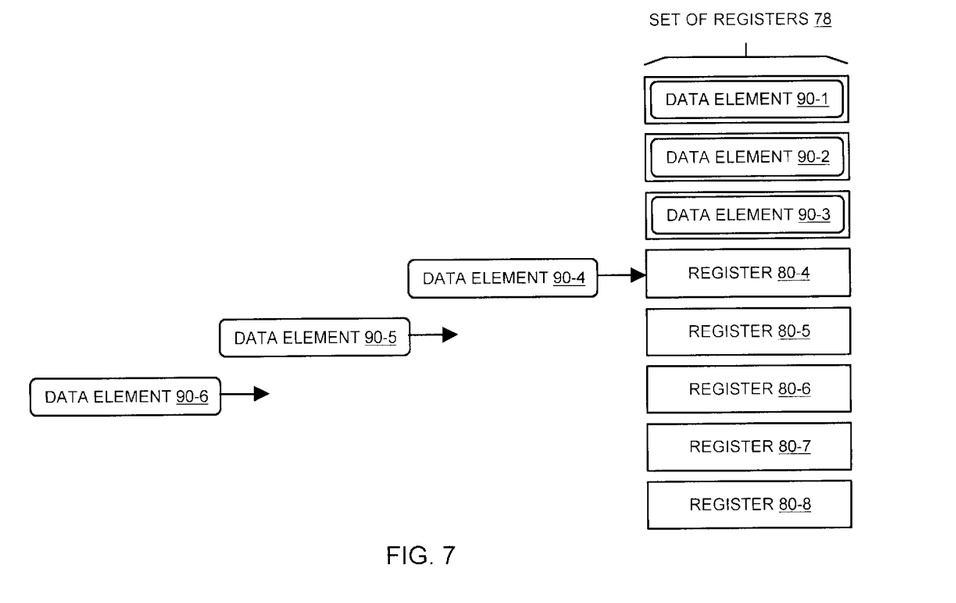
FIG. 7 is a block diagram illustrating how additional data elements sequentially load within the set of registers of FIG. 6.

FIG. 7 illustrates how additional data elements 90 load within the set of registers 80 of the integrated circuit device 52. As the additional data elements 90 load within the set 78 of registers 80, the earlier-loaded registers 80 continued to store the earlier-loaded data elements 90 (see data elements 90-1, 90-2, 90-3 in FIG. 7).

Figure 8:
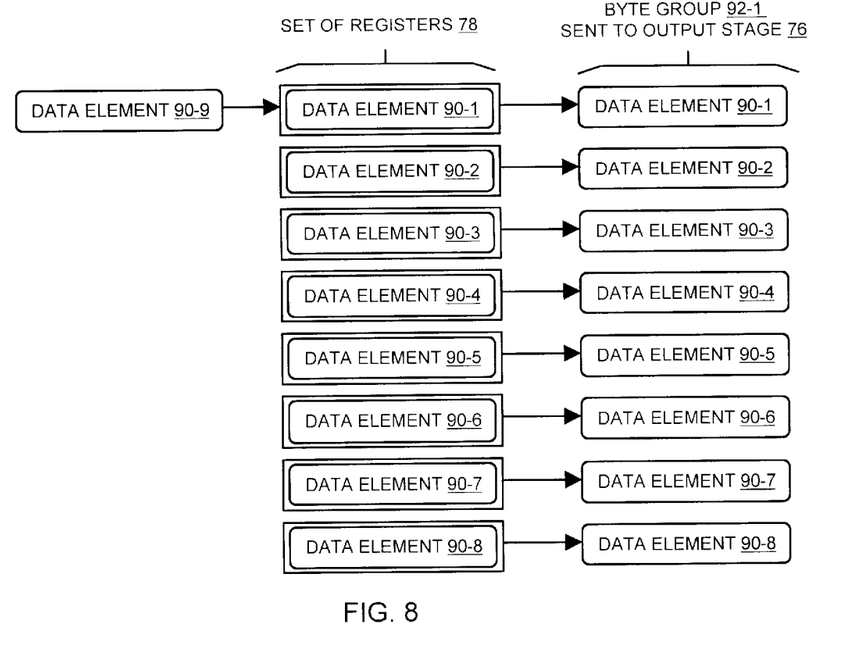
FIG. 8 is a block diagram illustrating how the set of registers of FIG. 7 provides a group of bytes when all of the registers contain a data element.

As shown in FIG. 8, when the set 78 of registers 80 is fully loaded with data elements 90, the control logic 86 of the controller directs the set 78 of registers 80 to output the register contents as a single byte group 92 (e.g., byte group 92-1), which is received by the output stage 76 (also see FIG. 3). Preferably, the flow of data elements 90 through the assembly stage 74 occurs in a pipelined manner, as illustrated by the data element 90-9 which is provided to one of the registers 80 for loading during a next clock cycle.

Figure 9:
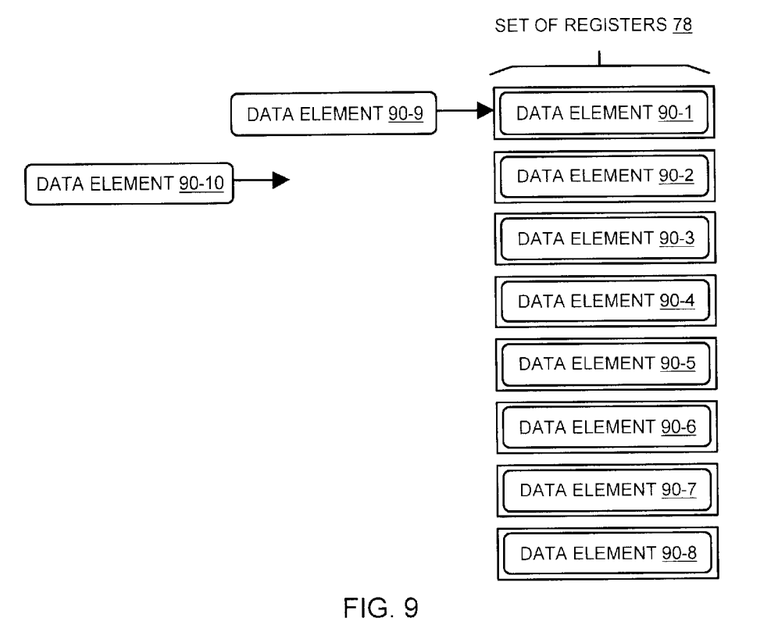
FIG. 9 is a block diagram illustrating how additional data elements sequentially load over existing data elements within the set of registers of FIG. 8.

FIG. 9 illustrates how additional data elements 90 load within the set 78 of registers 80 following output of the register contents. In particular, the set 78 of registers 80 continues to store the earlier-loaded data elements 90-1, . . . , 90-8, and the control logic 86 of the controller 60 loads the additional data elements 90 over the earlier-loaded data elements 90-1, . . . , 90-8. That is, the additional data elements 90 overwrite the earlier-loaded data elements 90.

Figure 10:
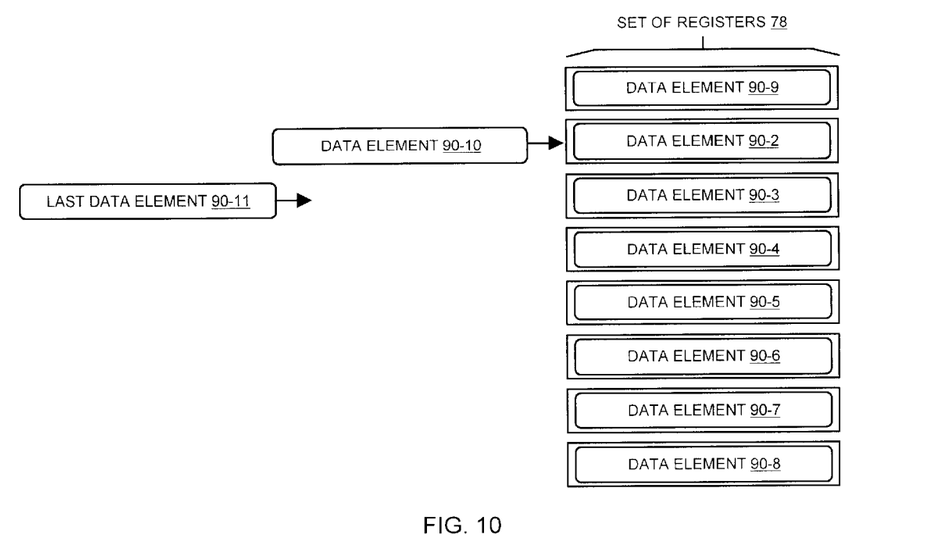
FIG. 10 is a block diagram illustrating how a last data element (i.e., an end of a stream of data elements) loads within the set of registers of FIG. 9.

As the data elements 90 continue to load within the set 78 of registers 80, and output from the set 78 of registers 80 as byte groups 92, the controller 60 keeps track of how many data elements 90 have been loaded into the set 78 of registers 80. Eventually, the last data element 90 loads into the set 78 of registers 80. The control logic 86 of the controller 60 identifies the last data element 90 (i.e., the end of the stream 88 of data elements 90) because it has counted the number of data elements 90 loaded into the set 78 of registers 80 and compared that number to the number of data elements 90 in the stream 88. As shown in FIG. 10 and by way of example only, the end of the stream 88 of data elements 90 is a last data element 90-11.

Figure 11:
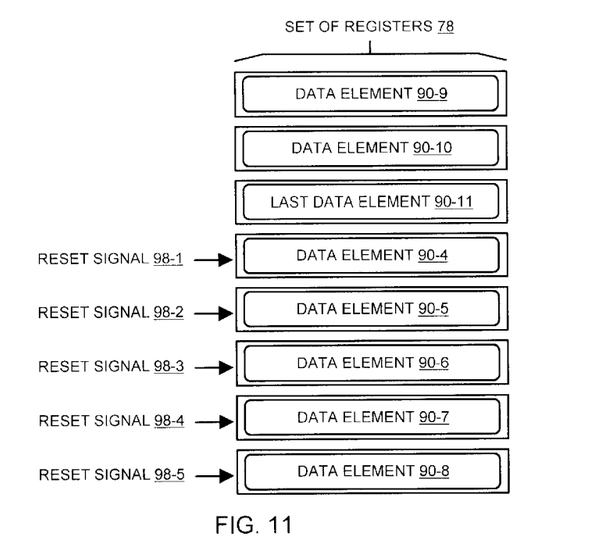
FIG. 11 is a block diagram illustrating how remaining registers of the set of registers of FIG. 10 are reset by respective reset signals after the last data element loads within the set of registers.

After the last data element 90-11 loads into the set 78 of registers 80 (preferably during the very next clock cycle), the control logic 86 of the controller 60 provides a set of reset signals 98 to the assembly stage 74 to reset any remaining unused registers 80, i.e., any registers 80 which do not contain a data element 90 of the current byte group 92. In the example and as shown in FIG. 11, there are five registers 80-4, . . . , 80-8 which do not contain a data element 90 of the current byte group 92. Rather, the registers 80-4, . . . , 80-8 contain old data elements 90-4, . . . , 90-8 of the previous byte group 92. Accordingly, the control logic 86 provides reset signals 98 to clear these registers. In particular, the control logic 86 provides reset signals 98-1, . . . , 98-5 to clear registers 80-4, . . . , 80-8, respectively. The control logic 86 determines which registers 80 to reset based on the number of data elements 90 in the stream 88 of data elements 90. Recall that this value is stored in the counter 80 4 of the controller 60 in response to the count signal 94 (see FIG. 3).

Figure 12:
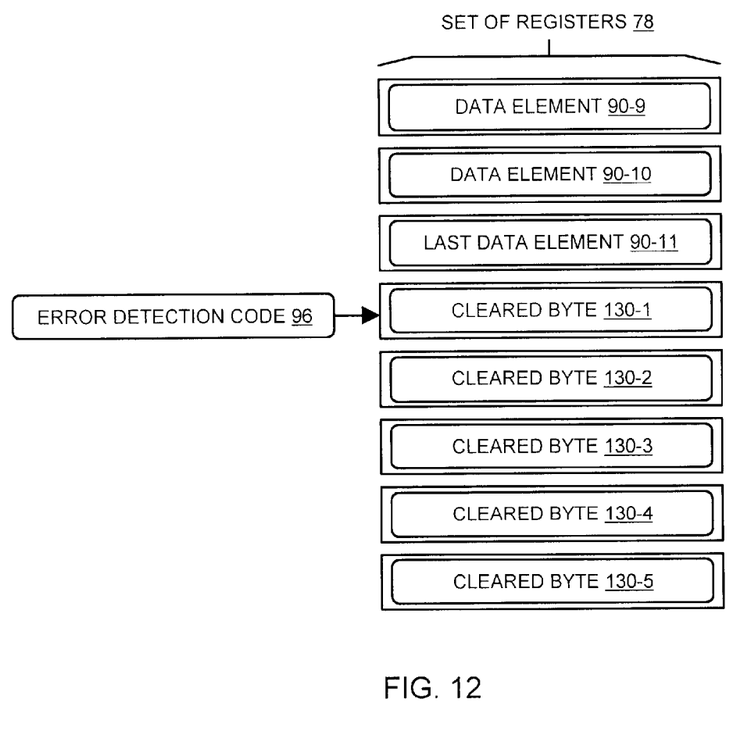
FIG. 12 is a block diagram illustrating how an error detection code loads within the next remaining register of FIG. 11 after the last data element.

FIG. 12 shows the contents of the set 78 of registers 80 after the reset signals 98-1, . . . , 98-5 clears registers 80-4, . . . , 80-8. As shown, the registers 80-4, . . . , 80-8 now store cleared bytes 130-1, . . . , 130-5, respectively. Preferably, on the very next clock cycle, the control logic 86 loads the error detection code 96 from the error detection code generator 82 into the register 80 which follows the last data element 90-11 (i.e., the unused register 80 adjacent the register 90 containing the last data element 90-11).

Figure 13:
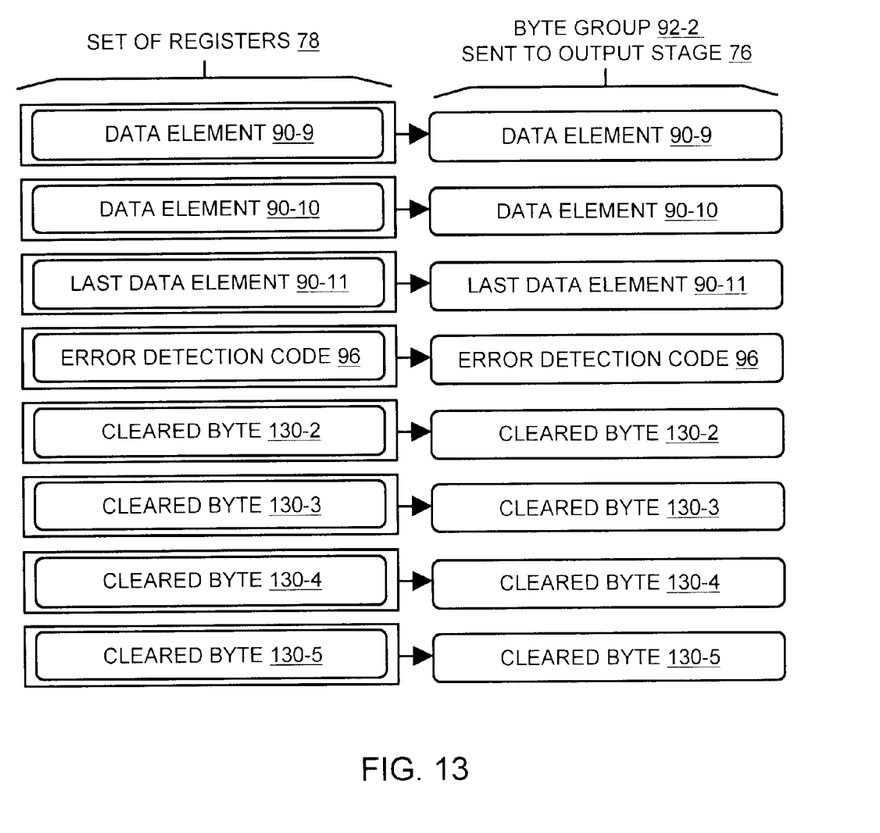
FIG. 13 is a block diagram illustrating how the set of registers of FIG. 12 provides a group of bytes including (i) an end of a stream of data elements, (ii) an error detection code, and (iii) a set of cleared bytes.

After the error detection code 96 loads into the set 78 of registers 80 as shown in FIG. 13, the controller 60 directs the set 78 of registers 80 to output the contents of the set 78 of registers 80 as the byte group 92-2. The byte group 92-2 includes the end of the stream 88 of data elements 90 (i.e., the last data element 90-11), the error detection code 96, and cleared bytes 130-2, . . . , 130-5. When the output stage 76 receives the byte group 92-2, the output stage 76 provides the byte group 92-2 to the memory 54 (also see FIG. 2).

If the data storage system 22 operates in shortened mode, the operation of the front-end interface 30 is complete. As mentioned earlier, shortened mode is suitable when the receiving memory (e.g., the memory 54, the cache 32, etc.) is clear such as immediately after startup or reset. The back-end interface 34 receives a complete sector of data 110 (e.g., see FIG. 5) which includes the stream 88 of data elements 90, the error detection code 96, and a set of cleared bytes 97.

Figure 14:
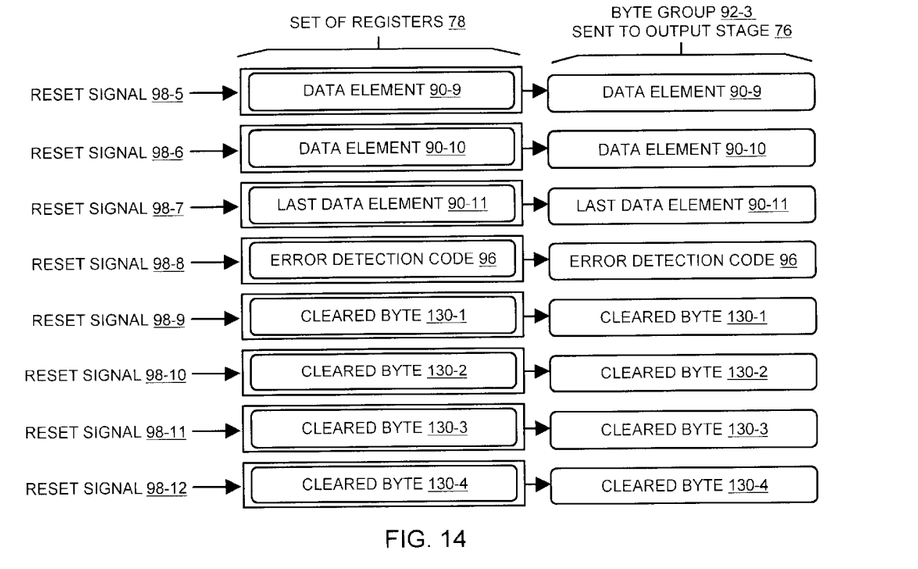
FIG. 14 is a block diagram illustrating how the set of registers of FIG. 13 provides a group of bytes including (i) an end of a stream of data elements, (ii) an error detection code, and (iii) a set of cleared bytes just prior to having the contents of each register reset.

However, if the data storage system 22 operates in sector alignment mode, the front-end interface 30 provides subsequent byte groups exclusively having cleared bytes in order to form a complete data sector 110. To this end, the control logic 86 of the controller 60 provides reset signals 98 during the next clock cycle to reset all of the set 78 of registers 80, as shown in FIG. 14.

Figure 15:
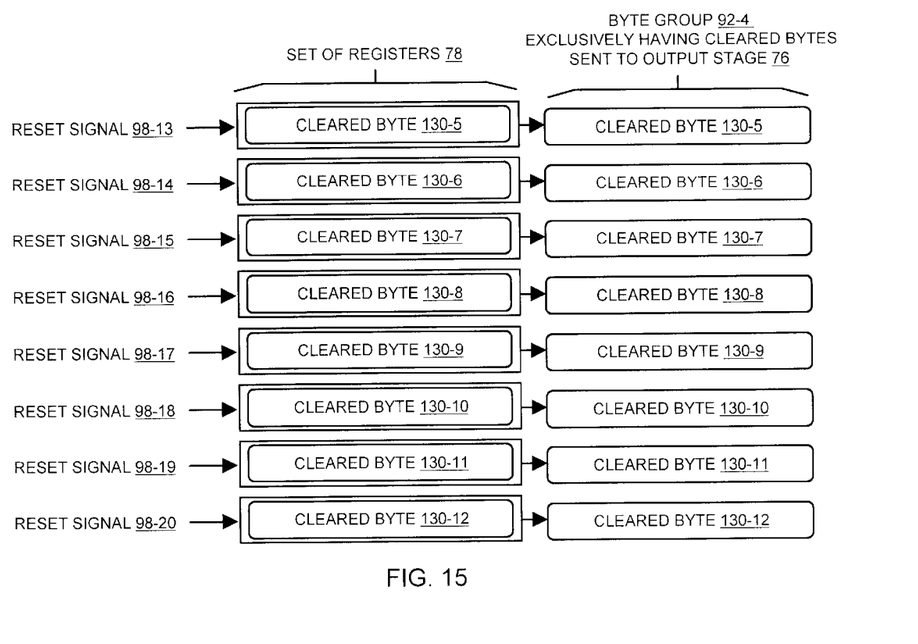
FIG. 15 is a block diagram illustrating how the set of registers of FIG. 14 provides a byte group exclusively having cleared bytes.

In response, the contents of the registers 80 are replaced with cleared bytes 130-5, . . . , 130-12, as shown in FIG. 15. The controller 60 then directs the set 78 of registers 80 to provide the contents of the registers 80 as the byte group 92-4 exclusively having cleared bytes. The controller 60 can continue to generate subsequent byte groups 92 exclusively having cleared bytes by providing additional reset signals 98 to the set 78 of registers 80 (e.g., reset signals 98-13, . . . , 98-20). In particular, the controller 60 continuously asserts the reset lines of the registers 80 so that the output of the registers 80 exclusively has cleared bytes. The timing and duration of the reset signals 98 is based on how many cleared bytes are needed to completely fill the data sector 110, i.e., based on the number of data elements 90 in the stream 88 of data elements 90 (also see counter 84 of FIG. 3).

It should be understood that the back-end interface 34 receives a data sector 110 which includes the stream 88 of data elements 90, followed by the error detection code 96 and the set of cleared bytes 97. The back-end interface 34 can then generate another error detection code (e.g. the CRC code) on the entire data sector 110 and simply compare this generated error detection code with the error detection code 96 contained within the data sector 110 to determine whether the data sector 110 is corrupt (i.e. garbled). Such operations can be implemented in hardware for speed and simplicity, or alternatively in software for flexibility.

It should be further understood that, once the front-end interface 30 provides the data sector 110 to the cache 32, the front-end interface 30 is ready for processing another stream 88 of data elements 90. To this end, the front-end interface 30 resets the memory pipeline 58 (e.g., disables and resets be integrated circuit device 52 using software) for the next received stream 88 of data elements 90.

As described above, the invention is directed to data storage techniques that include an error detection code 96 and cleared bytes 130 (e.g., zeroes) with data that does not have a standard size (e.g., CKD data). For example, the use of cleared bytes with CKD data alleviates the need to perform a complex series of software operations at the back-end to detect corrupted CKD data. Rather, when the CKD data is followed by an appended CRC code and cleared bytes to form an aligned block of data, error checking of the CKD data (and the entire data block) can simply involve generating a CRC code based on the entire data block and comparing that generated CRC code with the initial CRC code appended to the CKD data within that data block. Accordingly, the error detection process is relatively simpler and takes less time than a conventional approach which does not include cleared bytes with CKD data, but that performs more complex CRC code operations based on old, invalid data included with CKD data. The features of the invention may be employed in computer systems, devices and methods such as those manufactured by EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the error detection code 96 was described as a CRC code by way of example only. Other error checking codes are suitable for use as well such as simple parity, Hamming codes, Reed Solomon codes, any other error correction code, etc.

Additionally, it should be understood that the storage devices 36 were shown as describes by way of example only. Other types of storage devices are suitable for use as well including tape drives, CD drives, semiconductor memory, etc.

Furthermore, it should be understood that the cache 32 was described essentially as I/O memory by way of example only. The cache 32 can store other memory constructs for the data storage system 22 such as mapping tables which map cache sectors to sectors on the storage devices, communication mechanisms (e.g., mailboxes, sockets in other message passing resources), etc.

Additionally, it should be understood that the stream 88 of data elements 90 was described as CKD data by way of example only. Other types of data are suitable for use by the invention as well. In particular, the invention is well-suited for any type of data that does not have a standard size, i.e., that is not aligned on a consistent boundary (e.g., a 512 byte boundary).

Furthermore, the network connection 26 of the data storage network 20 was described as a SAN connection mechanism (e.g., ESCON) by way of example only. Other connection mechanisms are suitable for use by the invention as well such as small computer system interface (SCSI) connections, Fibre Channel, etc.

Additionally, it should be understood that the portion 70 of the integrated circuit device 52 (see FIGS. 2 and 3) was described as hardware by way of example only. It should be understood that the invention can be implemented in software as well.

Furthermore, it should be understood that the front-end interface 30 was described as resetting any remaining registers 80 before loading the error detection code 96 into one of the reset registers 80. Alternatively, the front-end interface 30 can load the error detection code 96 into one of the remaining registers 80, and subsequently reset any remaining registers 80. As another alternative, the front-end interface 30 and load the error detection code 96 and concurrently reset any remaining registers 80. Such modifications are intended to be within the scope of the invention.

What is claimed is:

1. A circuit, comprising:
   a memory pipeline that (i) receives a stream of data elements, and (ii) provides a series of byte groups that includes the stream of data elements, an error detection code and a set of cleared bytes; and
   a controller, coupled to the memory pipeline, that provides the error detection code and the set of cleared bytes to the memory pipeline such that each of the series of byte groups provided by the memory pipeline has a same byte width.

2. The circuit of claim 1 wherein the memory pipeline includes an output stage that connects to an external memory, and wherein the controller is configured to direct the memory pipeline to further provide a set of subsequent byte groups exclusively having cleared bytes such that the output stage provides both the series of byte groups and the set of subsequent byte groups to the external memory to exactly fill a sector of the external memory with the series of byte groups and the set of subsequent byte groups.

3. The circuit of claim 1 wherein the memory pipeline includes:
   an input stage that receives the stream of data elements;
   an output stage that provides the series of byte groups; and
   an assembly stage, interconnected between the input and output stages, having a set of registers, wherein the controller is configured to (i) load a data element from the stream of data elements into each of the set of registers sequentially until all of the registers in the set of registers contain a respective data element thus forming a byte group, and (ii) effectuate transfer of that byte group from the assembly stage to the output stage, and wherein the controller is further configured to reset any remaining registers after a last data element at an end of the stream of data elements loads into the set of registers.

4. The circuit of claim 3 wherein the controller is further configured to load the error detection code into one of the remaining registers after the controller resets the remaining registers.

5. The circuit of claim 3 wherein the controller includes an input that receives a count signal indicating the number of data elements in the stream of data elements, and wherein the controller is configured to reset the remaining registers based on the number of data elements in the stream of data elements.

6. The circuit of claim 3 wherein the controller is further configured to (i) transfer a byte group having the error detection code to the output stage, and (ii) subsequently reset all of the registers of the set of the registers of the assembly stage to provide a set of subsequent byte groups exclusively having cleared bytes, such that the output stage provides both the series of byte groups and the set of subsequent byte groups to an external memory to exactly fill a sector of the external memory with the series of byte groups and the set of subsequent byte groups.

7. The circuit of claim 1 wherein the memory pipeline is configured to provide, as a sector of data, (i) the stream of data elements, (ii) the error detection code, and (iii) the set of cleared bytes; wherein the error detection code is disposed between the stream of data elements and the set of cleared bytes and separates the stream of data elements and the set of cleared bytes; wherein the stream of data elements resides at one end of the sector of data and the set of cleared bytes resides at another end of the sector of data.

8. The circuit of claim 7 wherein the memory pipeline includes:
 a series of eight registers which output the sector of data in byte groups having a byte width equal to eight bytes, each of the series of eight registers being configured to output a data element in response to receipt of the data element, the error detection code in response to receipt of the error detection code, and a cleared byte in response to a reset signal.

9. In a data storage system, a method for providing data, comprising the steps of:
 introducing a stream of data elements within a memory circuit;
 placing an error detection code and a set of cleared bytes within the memory circuit; and
 providing, from the memory circuit, a series of byte groups that includes the stream of data elements, the error detection code and the set of cleared bytes, wherein each of the series of byte groups has a same byte width.

10. The method of claim 9, further comprising the step of:
 providing, from the memory circuit, a set of subsequent byte groups exclusively having cleared bytes such that the series of byte groups and the set of subsequent byte groups exactly fill a sector of an external memory.

11. The method of claim 9 wherein the memory circuit includes a set of registers, and wherein the step of placing includes the step of:
 resetting any remaining registers after a last data element at an end of the stream of data elements loads into the set of registers.

12. The method of claim 11 wherein the step of placing further includes the step of:
 loading the error detection code into one of the remaining registers after the controller resets the remaining registers.

13. The method of claim 11 wherein the step of placing further includes the step of:
 resetting the remaining registers based on the number of data elements in the stream of data elements.

14. The method of claim 11 wherein the step of placing further includes the step of:
 resetting all of the registers of the set of the registers to provide a set of subsequent byte groups exclusively having cleared bytes, such that the series of byte groups and the set of subsequent byte groups exactly fill a sector of an external memory.

15. The method of claim 9 wherein the step of providing includes:
 outputting, as a sector of data, (i) the stream of data elements, (ii) the error detection code, and (iii) the set of cleared bytes; wherein the error detection code is disposed between the stream of data elements and the set of cleared bytes and separates the stream of data elements and the set of cleared bytes; wherein the stream of data elements resides at one end of the sector of data and the set of cleared bytes resides at another end of the sector of data.

16. The method of claim 15 wherein the step of outputting includes:
 transmitting, from a series of eight registers, the sector of data in byte groups having a byte width equal to eight bytes, each of the series of eight registers being configured to transmit a data element in response to receipt of the data element, the error detection code in response to receipt of the error detection code, and a cleared byte in response to a reset signal.

17. A data storage system, comprising:
 an input/output circuit;
 a set of storage devices; and
 an interface circuit interconnected between the input/output circuit and the set of storage devices, the interface circuit having:
  a memory pipeline that (i) receives a stream of data elements from the input/output circuit, and (ii) provides a series of byte groups that includes the stream of data elements, an error detection code and a set of cleared bytes to the set of storage devices, and
  a controller, coupled to the memory pipeline, that provides the error detection code and the set of cleared bytes to the memory pipeline such that each of the series of byte groups provided by the memory pipeline has a same byte width.

18. The data storage system of claim 17 wherein the set of disk drives includes a disk drive having sectors, wherein the memory pipeline includes an output stage that connects to an external memory, and wherein the controller is configured to direct the memory pipeline to further provide a set of subsequent byte groups exclusively having cleared bytes such that the output stage provides both the series of byte groups and the set of subsequent byte groups to the disk drive of the set of disk drives to exactly fill a sector of the disk drive with the series of byte groups and the set of subsequent byte groups.

19. The data storage system of claim 17 wherein the memory pipeline includes:
 an input stage that receives the stream of data elements;
 an output stage that provides the series of byte groups; and
 an assembly stage, interconnected between the input and output stages, having a set of registers, wherein the controller is configured to (i) load a data element from the stream of data elements into each of the set of registers sequentially until all of the registers in the set of registers contain a respective data element thus forming a byte group, and (ii) effectuate transfer of that byte group from the assembly stage to the output stage, and wherein the controller is further configured to reset any remaining registers after a last data element at an end of the stream of data elements loads into the set of registers.

20. The data storage system of claim 19 wherein the controller is further configured to load the error detection code into one of the remaining registers after the controller resets the remaining registers.

21. The data storage system of claim 19 wherein the controller includes an input that receives a count signal indicating the number of data elements in the stream of data elements, and wherein the controller is configured to reset the remaining registers based on the number of data elements in the stream of data elements.

22. The data storage system of claim 19 wherein the set of disk drives includes a disk drive having sectors, wherein the controller is further configured to (i) transfer a byte group having the error detection code to the output stage, and (ii) subsequently reset all of the registers of the set of the registers of the assembly stage to provide a set of subsequent byte groups exclusively having cleared bytes, such that the output stage provides both the series of byte groups and the set of subsequent byte groups to the disk drive of the set of disk drives to exactly fill a sector of the disk drive with the series of byte groups and the set of subsequent byte groups.

23. The data storage system of claim 17 wherein the memory pipeline of the interface circuit is configured to provide, as a sector of data, (i) the stream of data elements, (ii) the error detection code, and (iii) the set of cleared bytes; wherein the error detection code is disposed between the stream of data elements and the set of cleared bytes and separates the stream of data elements and the set of cleared bytes; wherein the stream of data elements resides at one end of the sector of data and the set of cleared bytes resides at another end of the sector of data.

24. The data storage system of claim 23 wherein the memory pipeline of the interface circuit includes:

a series of eight registers which output the sector of data in byte groups having a byte width equal to eight bytes, each of the series of eight registers being configured to output a data element in response to receipt of the data element, the error detection code in response to receipt of the error detection code, and a cleared byte in response to a reset signal.

25. A circuit board, comprising:

a first integrated circuit device having:

a memory pipeline that (i) receives a stream of data elements from the input/output circuit, and (ii) provides a series of byte groups that includes the stream of data elements, an error detection code and a set of cleared bytes to the set of storage devices, and a controller, coupled to the memory pipeline, that provides the error detection code and the set of cleared bytes to the memory pipeline such that each of the series of byte groups provided by the memory pipeline has a same byte width; and a memory device, coupled to the first integrate circuit device, that receives the series of byte groups provided by the memory pipeline of the integrated circuit device.

26. The circuit board of claim 25 wherein the memory pipeline of the first integrated circuit device includes an output stage that connects to the memory device, and wherein the controller of the first integrated circuit device is configured to direct the memory pipeline to further provide a set of subsequent byte groups exclusively having cleared bytes such that the output stage provides both the series of byte groups and the set of subsequent byte groups to the memory device to exactly fill a sector of the memory device with the series of byte groups and the set of subsequent byte groups.

27. The circuit board of claim 25 wherein the memory pipeline of the first integrated circuit is configured to provide, as a sector of data, (i) the stream of data elements, (ii) the error detection code, and (iii) the set of cleared bytes; wherein the error detection code is disposed between the stream of data elements and the set of cleared bytes and separates the stream of data elements and the set of cleared bytes; wherein the stream of data elements resides at one end of the sector of data and the set of cleared bytes resides at another end of the sector of data.

28. The circuit board of claim 27 wherein the memory pipeline of the first integrated circuit includes:

a series of eight registers which output the sector of data in byte groups having a byte width equal to eight bytes, each of the series of eight registers being configured to output a data element in response to receipt of the data element, the error detection code in response to receipt of the error detection code, and a cleared byte in response to a reset signal.

* * * * *